(12) United States Patent
Zink et al.

(10) Patent No.: US 6,498,455 B2
(45) Date of Patent: Dec. 24, 2002

(54) WIRELESS BATTERY CHARGING SYSTEM FOR EXISTING HEARING AIDS USING A DYNAMIC BATTERY AND A CHARGING PROCESSOR UNIT

(75) Inventors: Uwe Zink, Tucson, AZ (US); Gary Skuro, 12035 E. Dry Gultch Pl., Tucson, AZ (US) 85749

(73) Assignee: Gary Skuro, Tucson, AZ (US)

( * ) Notice: Subject to any disclaimer, the term of this patent is extended or adjusted under 35 U.S.C. 154(b) by 0 days.

(21) Appl. No.: 10/080,240

(22) Filed: Feb. 22, 2002

(65) Prior Publication Data

US 2002/0113572 A1 Aug. 22, 2002

Related U.S. Application Data

(60) Provisional application No. 60/270,147, filed on Feb. 22, 2001.

(51) Int. Cl.[7] .................................................. H02J 7/00
(52) U.S. Cl. ............................................ 320/108; 320/107
(58) Field of Search ................................ 320/108, 107; 381/69.2, 68, 68.6; 336/DIG. 2

(56) References Cited

U.S. PATENT DOCUMENTS

| | | | |
|---|---|---|---|
| 4,379,988 A | 4/1983 | Mattatall | |
| 5,712,919 A | * 1/1998 | Ruhling | 381/69.2 |
| 5,959,433 A | 9/1999 | Rohde | |
| 6,310,960 B1 | 10/2001 | Saaski et al. | 381/323 |

* cited by examiner

Primary Examiner—Edward H. Tso
Assistant Examiner—Lawrence Luk
(74) Attorney, Agent, or Firm—Robert Platt Bell

(57) ABSTRACT

A rechargeable battery which may be used with most presently available hearing aids (or other appliances) with no modification to the existing hearing aid is needed in order to use the described wireless charging system. The battery may be known a "Dynamic battery" as the battery is actively charged by means of an inductor circuit built into the battery housing itself or added onto the battery. The hearing aid may simply be placed within the charger housing (or cradle) to charge the battery. No electrical connection by either wires or electrical contacts is needed to recharge the battery, which is located inside the hearing aid housing. Moreover, the battery need not be removed from the hearing aid (or other appliance).

4 Claims, 5 Drawing Sheets

WIRELESS BATTERY CHARGING SYSTEM FOR EXISTING HEARING AIDS USING A DYNAMIC BATTERY AND A CHARGING PROCESSOR UNIT

CROSS-REFERENCE TO RELATED APPLICATIONS

The present application claims priority from Provisional U.S. Patent Application No. 60/270,147 filed on Feb. 22, 2001, and incorporated herein by reference.

FIELD OF THE INVENTION

The present invention relates to a rechargeable battery particularly for use in hearing aids or the like. In particular, the present invention is directed toward a hearing aid battery with a built-in inductive charging coil for recharging the hearing aid battery in situ.

BACKGROUND OF THE INVENTION

Each hearing aid needs a battery power source to provide electrical current to its components. In Prior Art hearing aids, standard non-rechargeable batteries are used. Such batteries may last less than seven days before going dead. Constant replacement of hearing aid batteries is time consuming, expensive, environmentally unfriendly, and in many cases, a trying task.

Because of the small physical size of the batteries and the hearing aid housing, a large number of individuals who could benefit from the use of hearing aids are unable to do so because of their inability to open and close the access doors to the battery compartment in the hearing aid. It is very hard for most people, and impossible for others, particularly the elderly, who make up a large portion of hearing aid users.

Rechargeable batteries are known in the art. Various types of chemical compounds and mixtures for such batteries are know (e.g., Nickel and Cadmium, or NiCad). However, such Prior Art rechargeable batteries usually require removal of the battery or battery pack in order to charge the battery, or require the use of electrical contacts on the appliance for battery charging.

For example, cellular phones are generally provided with a removable battery pack which may be either charged while attached to the phone, or after removal, through use of a "charging stand". Cordless phones may use a built-in (e.g., hard wired) battery pack which may be charged when the phone is placed in its cradle. While such designs work well for fairly large appliances such as cellular phones or cordless phones, the use of external electrical contacts or removable battery packs may not be suitable for some applications, such as hearing aids.

External electrical connections may be difficult to physically implement on an object as small as a hearing aid, and moreover, may present a shock hazard to the user (as well as potential corrosion problems when placed in contact with the alimentary canal). Removable battery packs present the same or similar problem to prior art hearing aids as described above - such a removable pack would be so small as to make it difficult, if not impossible, for a user to manipulate (especially elderly users which comprise a large majority of hearing aid customers). In addition, providing a removable battery pack would necessitate seam lines on the hearing aid housing and electrical contacts, both of which may increase the size and cost of the hearing aid or present sharp edges which are unacceptable in an in-the-ear design.

Rechargeable batteries in standard sizes (e.g., "D", "C", "AA" and "AAA") are also known in the art and may be purchased as substitutes for standard non-rechargeable batteries. Generally, such rechargeable batteries do not last as long as a comparative alkaline battery before recharging is required. When recharging is required, the batteries must generally be removed from their battery compartment (unless a separate charging port and circuit are provided) and placed in a stand-alone charger.

Presuming that a rechargeable battery could be provided for appliances as small as a hearing aid (or the like), such a solution would not solve the fundamental underlying problem of battery insertion and removal. In contrast, such a solution would only increase the frequency at which a hearing aid battery would need to be removed and replaced.

Inductive chargers are known in the art for use with small appliances such as electric toothbrushes and the like. Current passes through an inductive coil in a charging stand. A current is induced in a mating coil in the appliance when the appliance is placed in the charging stand. This current is then used to charge the batteries within the appliance. Such inductive chargers are particularly useful for appliances used in wet environments such as electric toothbrushes and other dental care items. Such chargers, however, have the advantage of being able to mechanically locate the appliance in a predetermined orientation (e.g., via a tab or other locating device) in relationship to the charging coil such that the appliance and charger are at optimal position for inducing current.

One approach to solving the hearing aid battery problem would be to apply such a Prior Art inductive charging system to a hearing aid (or other small appliance) design. Mattatall, U.S. Pat. No. 4,379,988, issued Apr. 12, 1983 and incorporated herein by reference, discloses such a design. However, to implement such a design would require that the hearing aid manufacturer re-design the hearing aid (or other small appliance) to include the necessary charging circuitry. To the best of applicant's knowledge, no hearing aid designer has yet undertaken such a design change, and no commercial embodiment of the Mattatall Patent has yet been placed into production. Mattatall also discloses (Col. 5, lines 212) the use of an LED for rectifying current and for indicating to the user when the hearing aid is in optimal position for charging. Hearing aids, being very small, may be difficult to properly orient with relationship to an inductive charger. Thus, Mattatall uses his LED to allow the user to manually position the hearing aid for charging purposes.

Even if such a design were commercially available, it would still present problems to users. For example, existing hearing aid users would be forced to discard their present hearing aids and purchase a new, rechargeable model, if such a recharging feature were desired. Moreover, most rechargeable appliances (as in Mattatall) feature "built-in" batteries, such that when the battery is no longer capable of being charged, the entire appliance must be discarded. Moreover, it may be difficult for users to manually position the hearing aid in the charger for optimal current induction.

Rohde, U.S. Pat. No. 5,959,433, issued Sep. 28, 1999, and incorporated herein by reference, discloses battery pack for a laptop or the like, with an inductive charging circuit. The design of Rhode allows the battery pack to be removed and placed on an inductive charger without the need for physical electrical connections. There are several problems with this design. To begin with, it is not cost-effective to install an inductive charging circuit in a battery pack which already contains external electrical contacts.

As illustrated in FIG. 2 of Rohde, the battery pack 14 is provided with external electrical contacts at one end. It makes little or no sense to incorporate a relatively expensive and complex inductive charger into a batter pack when the battery pack can be readily recharged through inexpensive electrical contacts. Moreover, the inductive charging coil of Rohde appears to take up a substantial portion of the battery pack.

Moreover, the Rohde design appears to require that the battery pack be removed before charging. As noted above, the use of removable batteries or battery packs does not solve the fundamental problem with hearing aids and other small appliances where removal of the battery pack presents difficulty to the user. In addition, it does not appear that the device of Rohde would be scalable to something as small as a hearing aid.

Thus, a need still exists in the art to provide a method and apparatus for recharging a battery for a hearing aid (or other small appliance) without requiring removal of the battery from the appliance, without require the use of external physical electrical contacts, and without requiring the re-design of the appliance to incorporate such a charging circuit. The present invention solves all of these problems.

SUMMARY OF THE INVENTION

The object of the invention is to provide a user-friendly system of recharging existing hearing aid batteries, saving time, money and frustration. Rechargeable batteries are available for a variety of applications, but have not been utilized in hearing aids. The invention utilizes a wireless solution of charging a battery by inductively coupling energy between the battery and the charging unit. Therefore, no removal of the battery from the hearing aid is necessary. The user may simply place the hearing aid into the charging cradle at night for recharge.

The present invention further provides an inductive charging circuit within the housing of a standard hearing aid battery cell. By placing the inductive charging circuit within a standard hearing aid battery cell, a user can convert a Prior Art hearing aid which uses disposable batteries into a rechargeable hearing aid, simply be substituting the rechargeable battery/charger of the present invention for the non-rechargeable battery. The hearing aid (or other small appliance) may then be readily recharged without the need for battery removal. Moreover, the user need not remove the battery for months or even years. In addition, in an alternative embodiment, a novel charging station is provided with a rotatable induction coil. The induction coil may be automatically rotated by a controller until optimal current induction in the hearing aid battery coil occurs. This feature allows the hearing aid to be charged regardless of its relative position to the charging stand.

DETAILED DESCRIPTION OF THE INVENTION

Figure 1:
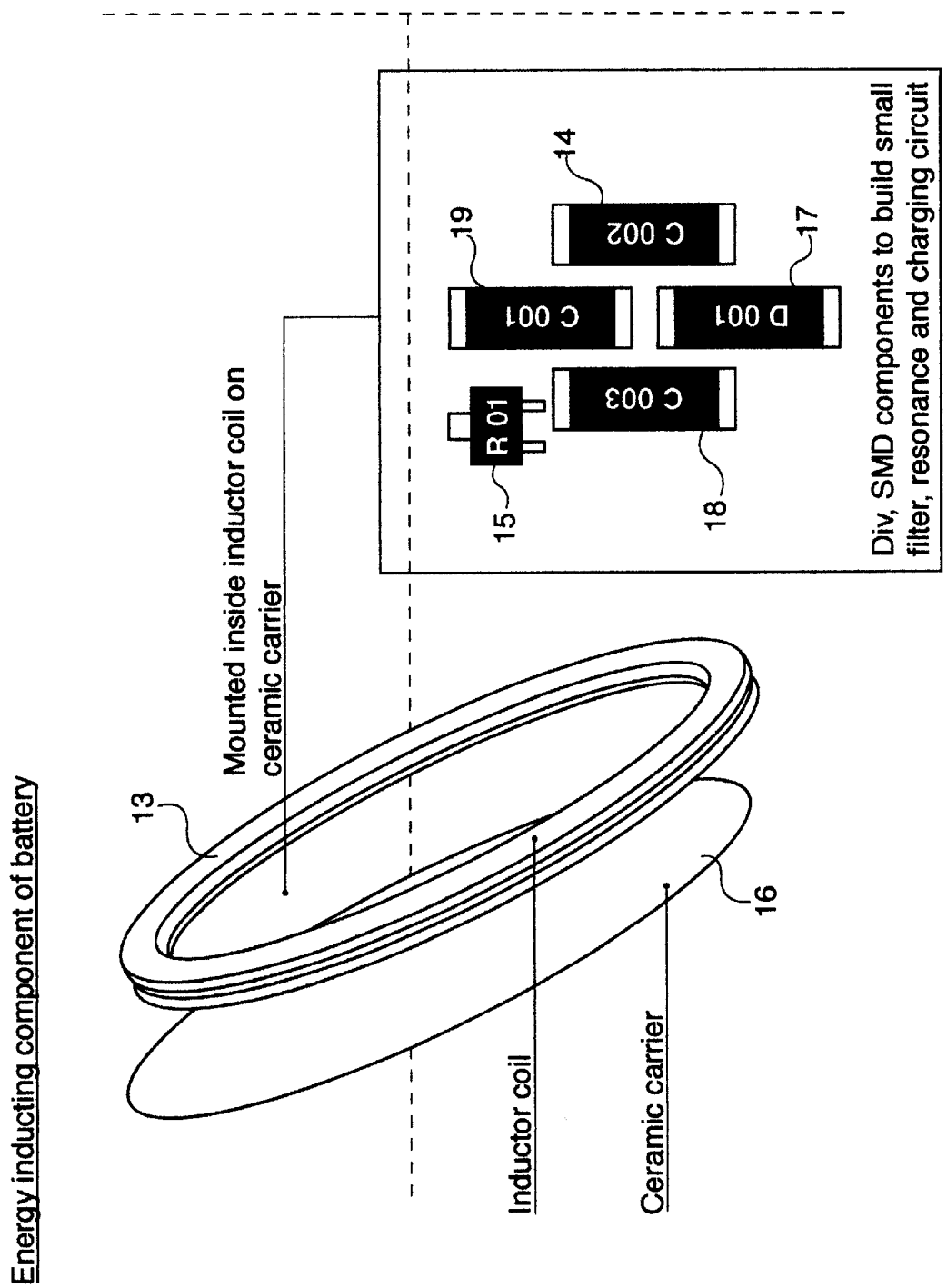
FIG. 1 is a perspective exploded view of the combined battery and inductive coil of the present invention showing the charging components in block diagram form.
Figure 3:
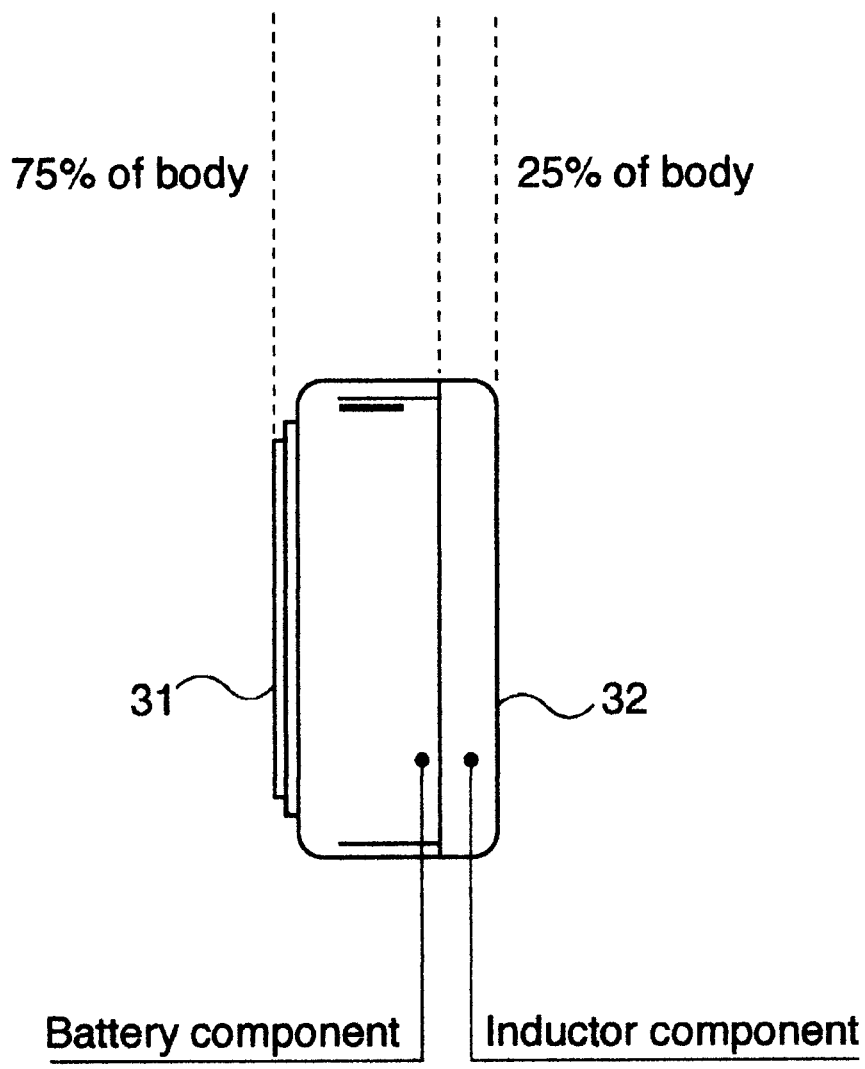
FIG. 3 is a side view of the combined battery and inductive coil of the present invention illustrating how the inductive coil and charging circuit can be incorporated into a standard sized battery case.

The Wireless Battery Charging System for hearing aids of the present invention may comprise two main components. The first of these is the combined battery and inductive charging coil and associated electronics which is referred to in the present invention as a "dynamic battery". FIG. 1 is a perspective exploded view of the combined battery and inductive coil of the present invention showing the charging components in block diagram form. FIG. 3 is a side view of the combined battery and inductive coil of the present invention illustrating how the inductive coil and charging circuit can be incorporated into a standard sized battery case.

Referring to FIG. 3, the dynamic battery may include two components. The first component is rechargeable battery portion 31 which may occupy about 75% of the battery overall housing. The battery housing is designed to be the same shape and size of a conventional non-rechargeable battery for use in a hearing aid or other small appliance such that the housing may be inserted into the hearing aid or other appliance without need to modify the appliance.

Again referring to FIG. 3, the second component of the dynamic battery is integrated electrical inductor circuit 32 made up of a tuned resonance circuit. FIG. 1 is a perspective exploded view of the inductive component 32 of FIG. 1 of the present invention showing the charging components in block diagram form. Electrical inductor component 32 of FIG. 3 may comprise a tuned resonance circuit including Coil 13 and Capacitor 14 as well as a regulated charging circuit 15 utilizing components such as surface mount resistors and regulators 14, 19, 18, and 17 to accommodate the small available space requirements of the dynamic battery.

The components of inductor circuit 32 of FIG. 3 may be mounted on a thin layer of ceramic 16 as illustrated in FIG. 1 to provide a carrier surface for all discreet components or in other words to create a small enough inductor hybrid to be placed inside the 25% of the overall dynamic battery housing. The wiring of the circuitry of FIG. 1 is not illustrated here, as such inductive charging circuits per se are known in the art, as discussed above.

Figure 2:
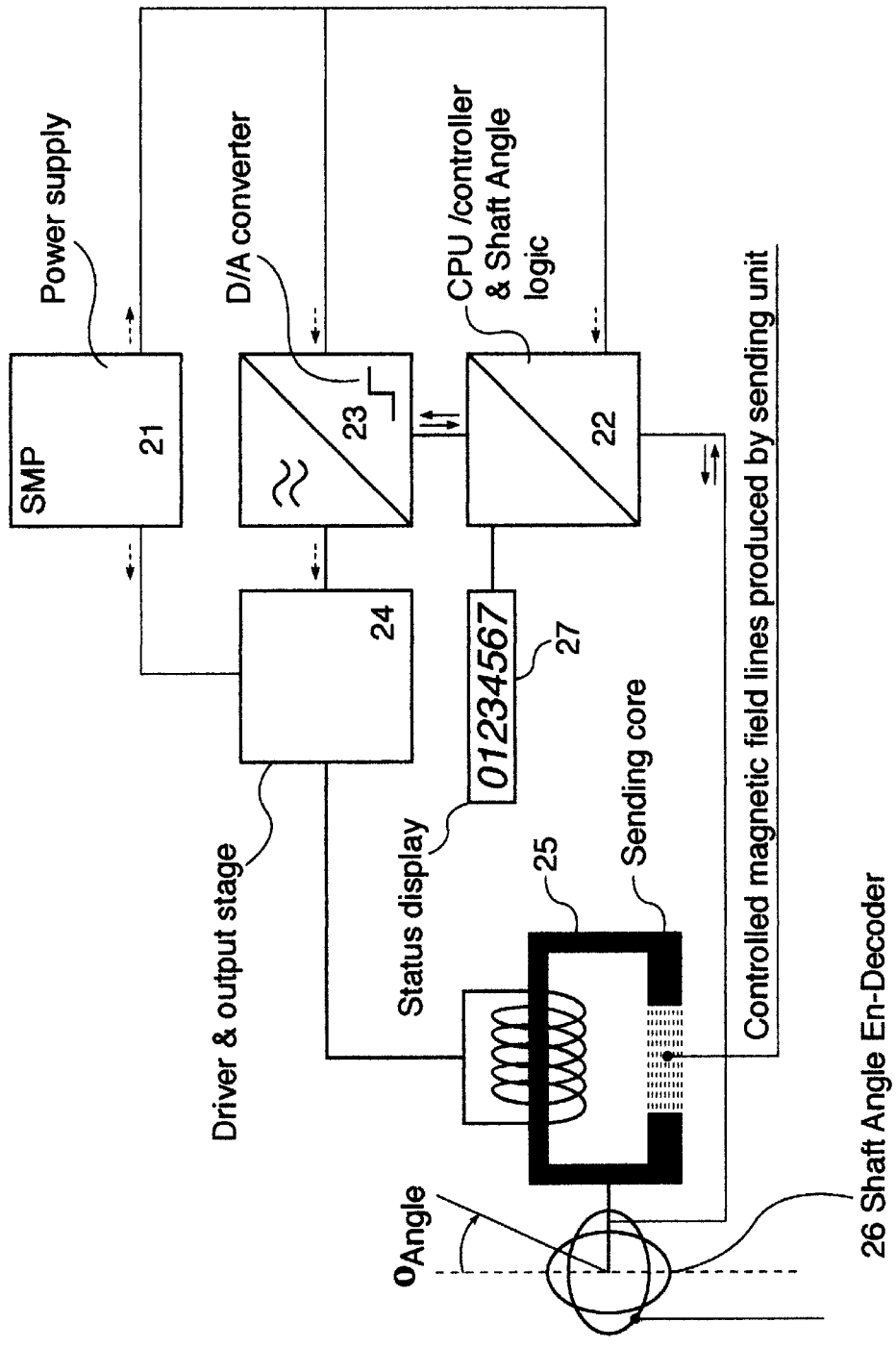
FIG. 2 is a block diagram of a charging station for use with the combined battery and inductive coil of FIG. 1.

FIG. 2 is a block diagram of a charging station for use with the combined battery and inductive coil of FIG. 1. The charging processor unit is a generator for controlling magnetic field lines. The charging processor may comprise the following components. SMP (Switch Mode Power Supply) power supply 21 provides the necessary current to the charging processor and its electrical components. Other types of power supplies may also be used within the spirit and scope of the present invention.

Control circuit to control the charging process and its stages may comprise digital control logic 22 containing a single chip processor and discreet components. Digital control logic 22 may monitor the charging process and determine when the rechargeable battery is fully charged by use of a timing mechanism or other means. Digital to analog converter 23 may convert digital charging information into an analog signal driving output stage 24, which powers an electromagnetic sending core 25.

Electromagnetic sending core 25 may comprise a motorized mechanism combined with a shaft angle de-encoder 26 which in turn supports a re-positioning mechanism for sending core 25. A digital display readout 27 may provide information of the charging process as charging/charged.

The functionality of the overall system may now be described in connection with FIGS. 1–5. If the dynamic battery is placed within range of the magnetic field lines produced by the charging processor, the built-in tuned resonance circuit of the inductor component of the dynamic battery may absorb energy from the charging processor unit which may then be used to charge the battery component.

Since the physical size of the batteries charging component is very small, the position of the sending core toward the inducting circuit of the battery may be critical. The solution to this is a controlled positioning system for the sending core. When a charging process is started, the sending core may be turned approximately 200 Degree in both directions via a motorized mechanism as illustrated in FIG. 2. Each position within a degree is reported to the CPU control logic 22 utilizing shaft angle encoder/decoder 26. At the same time, driver current (producing the magnetic field) for the sending core 25 is digitized and measured by the CPU control logic 22. The tuned inducting circuit of the battery will naturally absorb energy from the sending core magnetic field, which is measurable. CPU control logic 22 will determine the final position of sending core 25 based upon the driver current measurement and realign the position of sending core 25 for an optimal charging process.

Thus, the hearing aid with the battery of the present invention can be placed in almost any orientation within a charging stand and still be charged. Unlike Prior Art inductive charging appliances, the hearing aid need not be in a predetermined orientation. Unlike Mattatall, the hearing aid need not be reoriented manually based upon LED intensity. The user need only place the hearing aids (or other small appliances) in the charging stand and turn the unit on.

Figure 4:
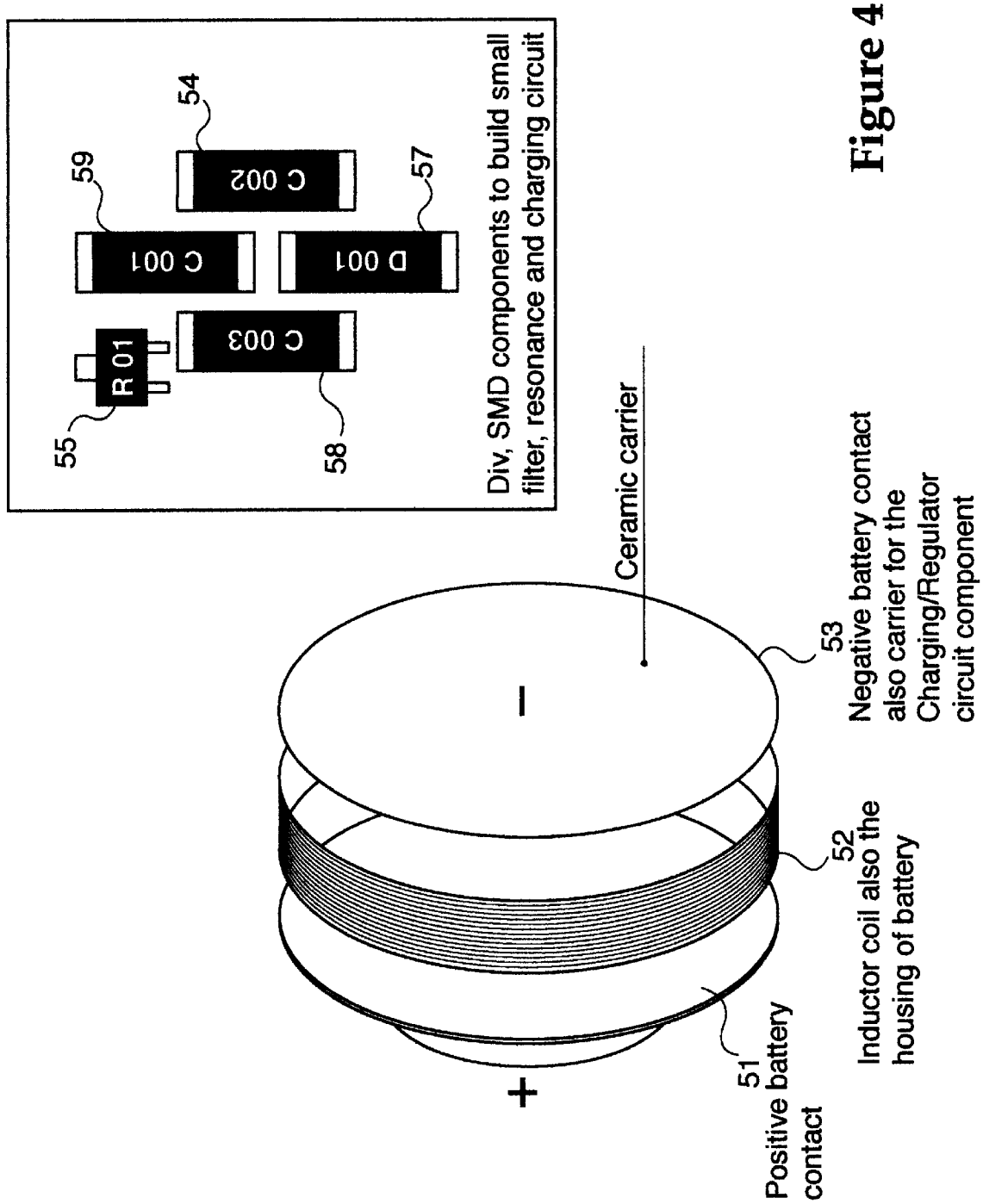
FIG. 4 is a perspective exploded view of the combined battery and inductive coil of a second embodiment of the present invention showing the charging components in block diagram form.
Figure 5:
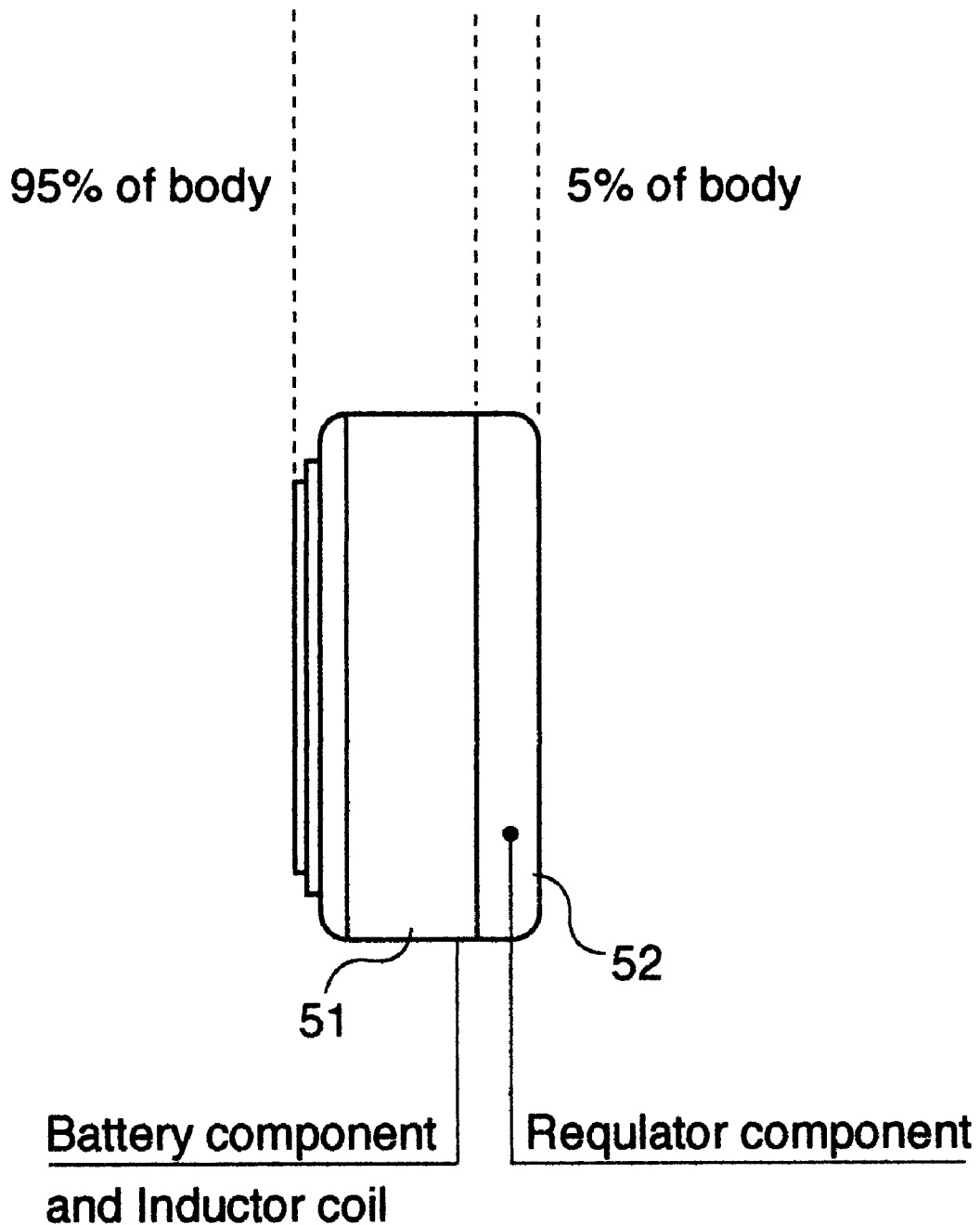
FIG. 5 is a side view of the combined battery and inductive coil of the second embodiment of the present invention illustrating how the inductive coil and charging circuit can be incorporated into a standard sized battery case.

FIG. 4 is a perspective exploded view of the combined battery and inductive coil of a second embodiment of the present invention showing the charging components in block diagram form. FIG. 5 is a side view of the combined battery and inductive coil of the second embodiment of the present invention illustrating how the inductive coil and charging circuit can be incorporated into a standard sized battery case. This second embodiment of the present invention may be substituted for the first embodiment of the present invention with respect to FIG. 2.

Referring to FIG. 5, the dynamic battery may comprise two components. The first component is rechargeable battery component 51 which may occupy about 95% of the battery overall housing. The battery housing is designed to be the same shape and size of a conventional non-rechargeable battery for use in a hearing aid or other small appliance such that the housing may be inserted into the hearing aid or other appliance without need to modify the appliance.

A Again referring to FIG. 5, the second component of the dynamic battery is integrated electrical inductor circuit portion 52 made up of a tuned resonance circuit. Note that in this second embodiment, the inductor portion takes up less space in the battery housing than the embodiment of FIGS. 1 and 3, leaving more room for battery portion 51.

FIG. 4 is a perspective exploded view of the combined battery and inductive coil of the present invention showing the charging components in block diagram form. Electrical inductor circuit 52 of FIG. 5 may comprise a tuned resonance circuit including coil 52 and capacitor 54 as well as a regulated charging circuit 55 utilizing components such as surface mount resistors and regulators 54, 59, 58, and 57 to accommodate the small available space requirements of the dynamic battery.

The components of inductor circuit 52 of FIG. 5 may be mounted on a negative battery contact 56 as illustrated in FIG. 4 to provide a carrier surface for all discreet components or in other words to create a small enough inductor hybrid to be placed inside the 5% of the overall dynamic battery housing. The wiring of the circuitry of FIG. 4 is not illustrated here, as such inductive charging circuits per se are known in the art, as discussed above.

As illustrated in FIG. 4, inductor coil 53 may comprise the lateral housing of the overall battery case, or may be wound inside such a case. By providing inductor coil 53 in this manner, additional space is left for the battery, and the size of inductor coil 53 may be increased. Positive battery contact 51 may for another portion of the battery housing. In this manner, the battery portion of the present invention can be maximized and the inductive components further miniaturized and made more compact.

While the preferred embodiment and various alternative embodiments of the invention have been disclosed and described in detail herein, it may be apparent to those skilled in the art that various changes in form and detail may be made therein without departing from the spirit and scope thereof.

For example, while disclosed herein as being applied to hearing aids and the like, the present invention could also be applied to other battery operated appliances such as watches, cellular phones, Personal Digital Assistants (PDAs), Flashlights, Toys, and the like. Battery sizes other than hearing aid batteries may be used (e.g., watch batteries, AAA, AA, C, D, and other sizes) without departing from the spirit and scope of the present invention.

We claim:

1. A rechargeable battery which may be recharged without removal from an appliance, the battery comprising:
    an inductive charging circuit formed within a first portion of a housing of a battery cell; and
    a rechargeable battery, formed within a second portion of a housing of the battery cell.

2. The rechargeable battery of claim 1, wherein the inductive charging circuit further comprises:
    an inductor coil having a diameter substantially the same as the battery case;
    a ceramic substrate, formed within the diameter of the inductor coil; and
    an inductive charging circuit, formed on the ceramic substrate.

3. The rechargeable battery of claim 1, wherein the inductive charging circuit further comprises:
    an inductor coil having a diameter substantially the same as the battery case, said inductor coil formed around the rechargeable battery;
    a battery terminal contact, for conducting current from the battery to the appliance; and
    an inductive charging circuit, formed on the battery contact.

4. The rechargeable battery of claim 3, wherein the inductor coil comprises a side wall portion of the battery case.

* * * * *